March 11, 1958 SIH HSUIN TSIANG 2,826,360

AUTOMATIC CIRCUIT SELECTOR

Filed Sept. 13, 1954 2 Sheets-Sheet 1

INVENTOR.
Sih Hsuin Tsiang
BY W. L. Stout
HIS ATTORNEY

AUTOMATIC CIRCUIT SELECTOR

Filed Sept. 13, 1954 2 Sheets-Sheet 2

INVENTOR.
Sih Hsuin Tsiang
BY
W. L. Stout
HIS ATTORNEY

United States Patent Office 2,826,360

Patented Mar. 11, 1958

2,826,360

AUTOMATIC CIRCUIT SELECTOR

Sih Hsuin Tsiang, Pittsburgh, Pa., assignor to Westinghouse Air Brake Company, Wilmerding, Pa., a corporation of Pennsylvania Application September 13, 1954, Serial No. 455,586

10 Claims. (Cl. 235—61.6)

Figure 1A:
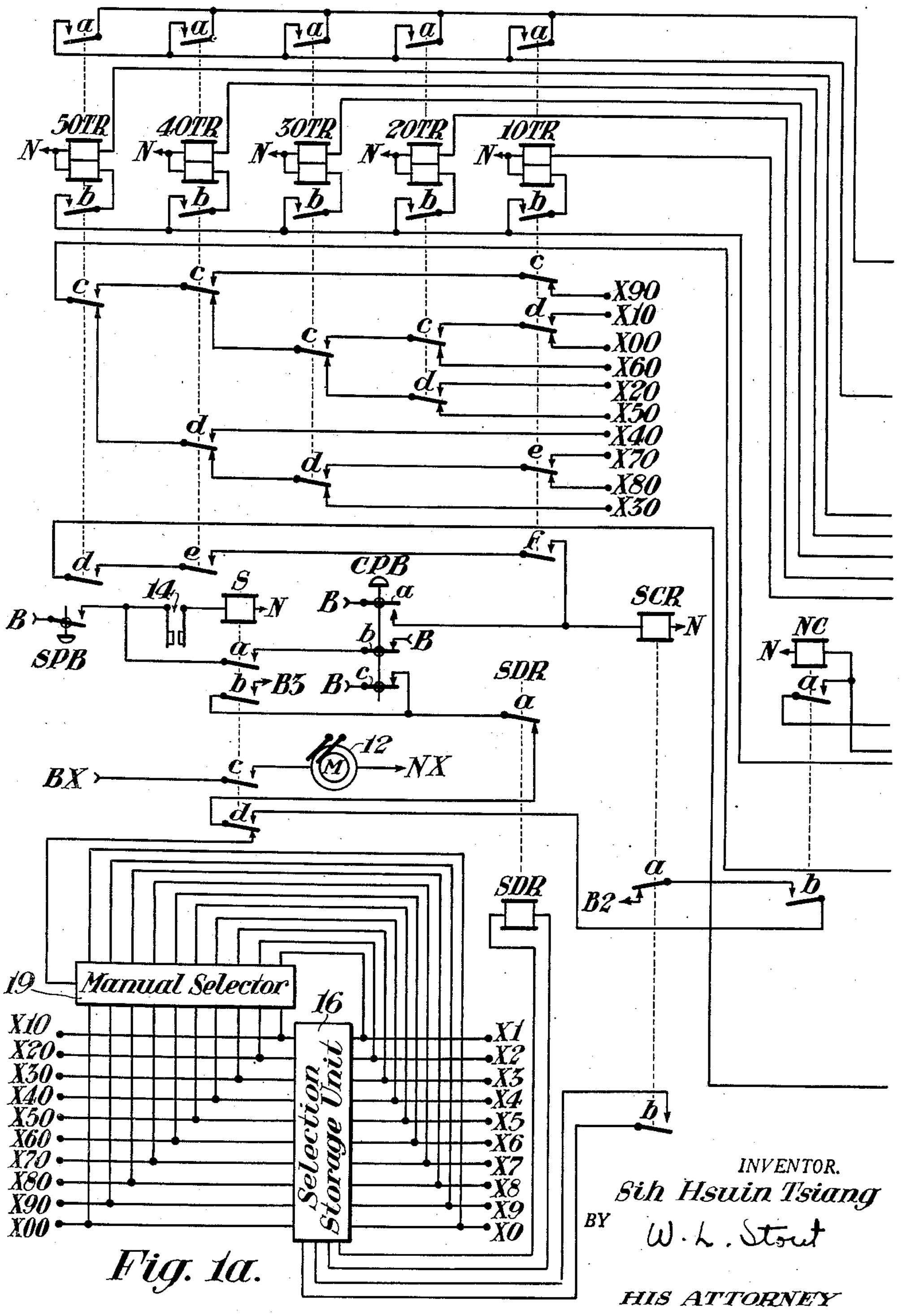

This invention relates to a system for automatically selecting a particular pair of a group of electrical circuits in accordance with coded information recorded on a code bearing medium.

More specifically, this invention relates to a system for translating code recorded on a punched tape, punched card or other code bearing device into data designating a particular pair of a group of electrical circuits and for selecting and energizing the indicated circuits. The circuits may be connected to relays or lamps or other operators or indicators in a manner whereby the system of this invention ultimately controls the operation of said operators or indicators.

This invention is related to and is an improvement upon the invention disclosed in copending application Serial No. 455,118, filed on September 10, 1954 in the names of Joseph G. Karlet and James M. Hesser for Automatic Switching Systems for Railway Classification Yards Utilizing a Punched Tape, both applications having a common assignor.

The system to be specifically disclosed is intended especially for use to select a pair of circuits which will be represented by a group of two consecutive related numbers recorded on a punched tape by punched holes arranged according to a prescribed code. The punched tape is of the type conventionally used in printing telegraph systems and the code employed is that known as Baudot code.

It is an object of this invention to provide a system for selecting a designated pair of a group of electrical circuits in accordance with coded information recorded on a code bearing medium.

This invention has for another object the provision of a system for automatically selecting in succession from a plurality of circuits the circuits indicated by code marks fed into the system by a code carrying medium. In order to increase the usefulness and practicality of the equipment, the output of the system is of a nature which may be conveniently stored in an external storage unit and circuit selections are made successively and continuously as long as a vacancy in which additional storages may be made exists in the storage unit. The selections are made by energizing the selected pair of a group of circuits so that the selection may easily be stored by energizing a corresponding device or corresponding devices in the storage unit.

One form of a storage unit which may be used in conjunction with this invention is shown in the copending application for Letters Patent of the United States, Serial No. 355,281, filed May 15, 1953, in the name of Benjamin Mishelevich for Automatic Switching for Classification Yards, which application is of common ownership with the present application. A similar storage unit is also shown and described in Manual 517, entitled "Union Automatic Switching for Classification Yards," published January 1953, by the Union Switch & Signal, Division of Westinghouse Air Brake Co.

A further object of this invention is to provide a control network for an automatic circuit selector whereby only complete and correct circuit designations will be interpreted and acted upon by the automatic circuit selector and incomplete or improper circuit designations will be rejected or cancelled. The automatic selector and control will also operate in response to a predetermined code input to provide a cancellation impulse which may be used to cancel a selection previously entered into the storage unit.

Still another object of this invention lies in teaching the construction of an automatic circuit selector employing a minimum number of circuit elements and adjuncts to accomplish the selection of a circuit from a plurality of circuits in accordance with coded notations entered into the selector.

Figure 1B:
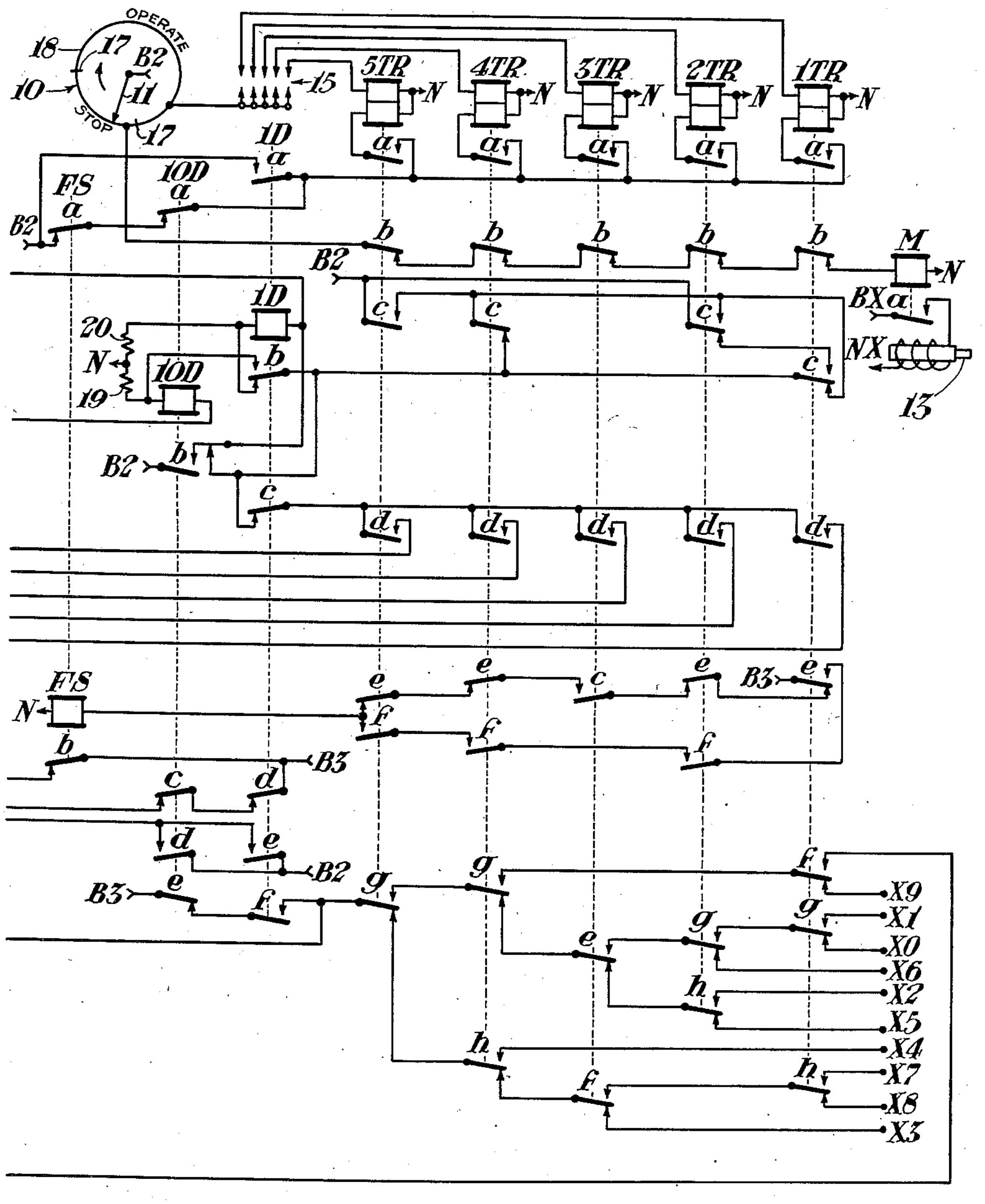

These and other objects of this invention and their attendant advantages will become apparent from the study of the following specification and drawings in which:

Figs. 1*a* and 1*b* when placed side by side in matching relation present a schematic illustration of the automatic circuit selector and the controls therefor, together with a representation in conventional block form of a storage unit and a manual selector, the details of which are shown in the previously mentioned publication.

For ease of description, the invention will be described as utilizing a tape, although as was previously pointed out, various mediums may be employed to supply an input to the system.

The invention includes a distributor 10 which controls the operating time of the code interpreting portion of the selector and also advances the tape or other medium on which the code is recorded to present each successive group of code marks for interpretation by the automatic selector. The distributor has a rotating contact arm 11 driven from a motor 12 and includes means, not shown, for advancing the tape after each translation to a position where the next coded character will be matched with code reading contacts 15. Driving power from the motor is transmitted to the distributor through a friction drive means, not shown. Rotation of the distributor arm 11 by the friction drive means is normally prevented by a detent, not shown. A release magnet 13, when energized, is effective to release the detent. Each time the detent is released it permits the rotating contact arm to make one complete revolution. Upon each revolution of the distributor arm the tape or other code carrying medium is also advanced by means, not shown, to place the code marks representing the next character in position to be interpreted by code reading contacts 15 Relay M is a release magnet energizing relay.

A start relay S connects energy to the tape reading and digit storing portions of the equipment, energizes the motor 12 and controls the supply of energy to any manual selection system which may be provided. Once the start push button SPB has been closed relay S remains energized as long as the tape detector contacts 14 are held closed by the presence of tape feeding into the system.

For use in selecting circuits represented by two numerals, the invention includes two sets of digit registering relays, unit digit register relays 1TR, 2TR, 3TR, 4TR and 5TR and tens digit register relays 10TR, 20TR, 30TR, 40TR and 50TR. The digit registering relays operate in accordance with the code being read at the code reading contacts 15. Circuit selections are made by the contacts of the digit register relays.

Relay NC is a number checking relay. Unless two numeral characters are interpreted in succession, relay NC will be deenergized and cause cancellation of any registration in the digit register relays. Relay FS will be energized whenever the character being interpreted by the tape reading relays is one of a predetermined group of characters. For example, the operation of relay FS may be made dependent upon the presence of a code group representing a space, a figure shift or a letter shift. Energization of relay FS will also cause cancellation of any registration in the digit register relays. Relay 1D and relay 10D are digit register detector relays. Relay 1D becomes energized upon the registration of a unit digit of a two digit number and relay 10D becomes energized upon the registration of the tens digit of a two digit number.

A cancel push button CPB is also provided for manually effecting cancellation of storages which have been entered into the selection storage unit. Relay SCR, the storage cancellation relay, operates in conjunction with the cancel push button CPB and may also be controlled automatically by the circuit selector. A certain combination of figures registered on the digit register relays, for example, the figures XX, will cause energization of relay SCR through the automatic selector. The function of relay SDR, the storage detection relay, is to limit the operation of the automatic circuit selector so that no selections are sent to the selection storage unit for storage unless there is a vacancy in that unit to accept the storage.

Referring more specifically to the drawing, the letters B and N denominate the two opposite terminals of a power supply. Power for the tape reading relays and for the control circuits except for the number checking relay NC and for relay FS is supplied from terminal B2. Terminal B2 is connected to terminal B of the power supply through a circuit which may be traced as follows: from terminal B of the power supply, through normally closed contact *c* of the cancel push button CPB, back contact *a* of relay SDR, front contact *d* of relay S, front contact *b* of relay NC and back contact *a* of relay SCR to terminal B2. It may be seen that terminal B2 will not be energized unless relay S and relay NC are energized, relay SDR is deenergized indicating that a vacancy exists in the storage unit, and relay SCR is deenergized indicating that no cancellation operation is being performed.

Energy to the number checking relay NC, to relay FS, and to the circuit selecting contacts of the digit register relays is supplied from terminal B3. Terminal B3 is connected to terminal B of the power supply through a circuit extending from terminal B, through the normally closed contact *c* of cancel push button CPB and front contact *b* of relay S to terminal B3. Energy will be available at terminal B3 only when relay S is energized for automatic circuit selection and no cancellation is being performed via cancel push button CPB.

The start relay S is energized over a circuit extending from terminal B of the power supply, through the start push button SPB and the tape detecting contacts 14, through the winding of relay S to terminal N of the power supply. Contacts 14 are closed whenever a tape or card or other code bearing medium is positioned to provide an input to the system. Relay S is held up by a circuit from terminal B of the power supply, through normally closed contact *b* of the cancel push button CPB, front contact *a* of relay S, contacts 14, and the winding of relay S to terminal N. Contact *b* of relay S controls the circuit to terminal B3 and contact *c* of relay S completes the circuit from terminal BX to terminal NX through the alternating current motor 12. Back contact *d* of relay S completes a circuit for supplying energy to a manual selector 19 which may be used to manually enter storages into the selection storage unit and front contact *d* completes a circuit for energizing terminal B2.

The distributor 10 comprises a rotating contact arm 11 which moves over an annular contact surface 18, separated into two segments by insulating spacers 17. The segments are designated on the drawing as the "Stop" and "Operate" segments. Energy from terminal B2 is connected to the contact arm 11. The "Stop" segment of the distributor is connected through the back contact *b* of each of relays 1TR, 2TR, 3TR, 4TR and 5TR in series and the winding of the release magnet energizing relay M to terminal N of the power supply so that with the unit digit register relays cleared of registrations and the contact arm 11 on the "Stop" segment, relay M will be energized picking up its contact *a*. With contact *a* up, release magnet 13 will be energized from a source of alternating current energy designated by the terminals BX and NX.

The lower set of tape reading contacts 15 are connected in parallel with each other to the "Operate" segment of the distributor. Five tape reading contacts are shown as would be the case when the selector is to be used for Baudot code, which employs five elements. It is obvious that the arrangement could be readily changed to accommodate any other code of a fewer or a greater number having elements.

Depending on the coded punch marks being read by the code reading contacts 15, one or more of the unit digit register relays will be energized and then held up by holding circuits extending from terminal B2 through back contact *a* of relay FS, back contact *a* of relay 10D, front contacts *a* of the respective unit digit register relays involved, and the lower or stick winding of these register relays to terminal N.

Separate energizing and stick windings are provided for the digit register relays to avoid "sneak" circuits, that is, circuits whereby relays other than those energized in accordance with the code being read may be energized through the holding circuits for the relays energized in accordance with the code.

Relay FS is a character checking relay arranged to be energized when certain characters, other than a numeral or an X, are indicated by the code being translated. A first circuit for energizing relay FS extends from terminal B3 through back contact *e* of relay 1TR, back contact *e* of relay 2TR, front contact *c* of relay 3TR, back contact *e* of relay 4TR, back contact *e* of relay 5TR, and the winding of relay FS to terminal N. Another circuit extends from terminal B3 through front contact *e* of relay 1TR, front contact *f* of relay 2TR, front contact *f* of relay 4TR, front contact *f* of relay 5TR, and the winding of relay FS to terminal N. Any character being translated that causes the unit digit register relays to be picked up in any combination which will provide a circuit path through the relay contacts just traced will cause relay FS to be energized and to pick up its contacts *a* and *b*. Energization of relay FS opens a holding circuit for the unit digit register relays at back contact *a* of relay FS and at its back contact *b* opens the holding circuit for relay NC causing that relay to become deenergized and release its contacts. When front contact *b* of relay NC is released, it opens the circuit from terminal B to terminal B2 removing energy from terminal B2 to thus clear any registrations in the automatic selector.

Relay 10D is the tens digit detector relay. Its function is to detect registration of the first digit in a two digit number and to then condition the selector so that the next digit registered will be registered in the unit digit register relays. Relay 10D is energized by a circuit which may be traced from terminal B2 through a combination of contacts *c* of the unit digit register relays which indicate the registration of a numeral or an X, back contact *b* of relay 10D, front contacts *a*, in parallel, of the tens digit register relays which have been picked up in accordance with the code being interpreted, the winding of relay 10D and resistor 19 to terminal N of the power supply. With relay 10D energized, it picks up to perform the following functions. Its back contact *a* opens the holding circuit to the unit digit registers relays. At its contact *b*, which is of the continuity or "make-before-break" type, it completes an obvious stick circuit for relay 10D and provides a circuit path from terminal B2 to the winding of relay 1D. At back contact *c*, relay 10D opens the energizing circuit for relay NC, which, however, remains energized, over a stick circuit involving its own front contact *a* and back contact *b* of relay FS, as long as relay FS remains deenergized. At front contact *d*, relay 10D completes a stick circuit for any of the tens digit register relays which have been energized and, at back contact *e*, opens a circuit for supplying energy from terminal B3 to the circuit selecting contacts of the digit register relays.

Relay 1D receives energy from terminal B2 through contact *b* of relay 10D, alone or in series with the numeral checking contacts, that is, contacts *c* of the unit digit register relays, whenever the position of these contacts indicates that a numeral or an X is being translated. However, the other side of the winding of relay 1D is also connected to terminal B2 through the numeral checking contacts and back contact *b* of relay 1D so that relay 1D cannot be energized. Resistor 20 acts to prevent a direct short circuit connection between terminal B2 and terminal N of the power supply when the winding of relay 1D is bypassed through its back contact *b*. When relay 1D is down, it establishes through its back contact *c* an energizing circuit for those tens digit register relays which correspond to the unit digit register relays which have been energized. This circuit extends from terminal B2 through a combination of the contacts *c* of relays 1TR, 2TR, 4TR and 5TR which indicate translation of a numeral, back contact *c* of relay 1D, the front contacts *d* of those unit digit register relays which have been energized and the corresponding energizing windings of the tens digit register relays to terminal N. The tens digit register relays which are energized are held up over a holding circuit which may be traced from terminal B2, through front contact *d* of relay 10D, front contacts *b* of the tens digit register relays and the stick windings of the tens digit register relays to terminal N.

When the distributor wiper arm 11 reaches the "Stop" segment of the contact 18 the energizing circuits for the unit digit register relays through arm 11 and contact 18 will be open and these relays will release if relay 10D has been energized causing the unit digit register relay stick circuits to have been opened at contact *a* of relay 10D. This removes the energy which was applied to one side of the winding of relay 1D from terminal B2 through the numeral checking contacts, that is, contacts *c* of relays 1TR, 2TR, 4TR and 5TR, and allows relay 1D to be energized by a circuit which may be traced as follows: from terminal B2, through front contact *b* of relay 10D, the winding of relay 1D, and resistor 20 to terminal N of the power supply.

When the wiper arm 11 reaches the "Stop" segment, the detent will engage the drive means. However, since the unit digit register relays are deenergized, relay M will again be energized by the circuit traced above to cause energy to be applied to the release magnet and the detent will be released allowing the contact arm to be driven through another complete revolution. The tape will also have been advanced so that the next set of coded punched marks will now be in position to be read by the code reading contacts 15.

It is to be noted that if the distributor wiper arm reaches the "Stop" segment before the digit is registered in the tens digit register relays, the distributor will be held at "Stop" by the detent since relay M cannot be energized because its energizing circuit will be open at the contacts of one or more of the unit digit register relays. Those unit digit register relays which are energized will remain stuck up over their holding circuits until the corresponding tens digit register relays have been energized and relay 10D has been energized over a circuit including contacts of the tens digit register relays. The stick circuits for the unit digit register relays will then be opened at back contact *a* of relay 10D and the circuit for energizing relay M will be completed over the back contacts *b* of the unit digit register relays.

Front contact *a* of relay 1D connects energy from terminal B2 to the holding contacts *a* of the unit digit register relays. Relay 10D is shunted by the application of energy from B2, through the numeral checking contacts, that is, contacts *c* of relays 1TR, 2TR, 4TR and 5TR, and front contact *b* of relay 1D to one side of the winding of relay 10D. The other side of the winding of relay 10D is also connected to terminal B2 by the previously traced circuit including front contact *b* of relay 10D. Thus, both sides of the winding of relay 10D are connected to terminal B2 so relay 10D will be deenergized and will release its contacts. Resistor 19 is employed to prevent a direct short circuit connection from terminal B2 to terminal N of the power supply. Energizing circuits for the tens digit register relays are opened at back contact *c* of relay 1D. The energizing circuit for relay NC is opened at back contact *d* of relay 1D but relay NC remains held up through an obvious stick circuit involving back contact *b* of relay FS as long as relay FS remains deenergized. Energy is applied from terminal B2 to the holding contacts *b* of the tens digit register relays through front contact *e* of relay 1D.

A more thorough understanding of the invention may be obtained from a study of the following description of the operation of the automatic circuit selector under various conditions.

For the purposes of an example of the operation of this system, it will be considered as being employed with tape coded by punched holes arranged in groups representing two digit numbers in accordance with a five element Baudot code.

For the first example assume that a tape is placed in the machine to close the contacts 14 and that the code marks representing the first digit of a two digit group are in position to be interpreted by the code reading contacts 15. Assume also that the automatic selector is connected to submit selections for storage to a selection storage unit 16 which has capacity for N storages and that the storage unit has vacancy for additional storages so that relay SDR, which detects complete occupancy of the storage unit, will be down. Relay SDR, for example, may be energized by a circuit arrangement within unit 16 which is completed when a circuit selection is stored in the initial storage bank and also during the period that a selection is being transferred from the initial bank into the succeeding bank. Reference is made to the previously mentioned Manual 517 for a complete understanding of possible methods of accomplishing these actions, the actual circuits forming no part of my invention.

Operation of the automatic selector is begun by closing start push button SPB to energize relay S by an obvious circuit. Relay S is stuck up over its own front contact *a* and closes its other contacts. Energy is applied to terminal B3 through front contact *b* of relay S and front contact *c* of relay S applies power to the motor 12. With terminal B3 energized, relay NC is picked up over a circuit extending from terminal B3, through back contact *d* of relay 1D, back contact *c* of relay 10D and the winding of relay NC to terminal N of the power supply. Energy is now applied to terminal B2 over a circuit previously traced including front contact *d* of relay S and front contact *b* of relay NC. With terminal B2 energized, an energizing circuit for relay M is completed from terminal B, through the contact arm 11, the "Stop" segment of the distributor, back contact *b* of each of the unit digit register relays, and the winding of relay M to terminal N of the power supply. Relay M picks up its contact *a* energizing the release magnet 13 so that the detent, not shown, will be released permitting the motor 12 to drive the wiper arm 11 through one complete revolution.

Assume that the number group being read indicates the number 21. The coded marks being read at the contacts 15, therefore, will represent the digit 2 and punched marks on the tape will be positioned so that relays 1TR, 2TR and 5TR will be energized when the wiper arm 11 reaches the "Operate" segment of the distributor. Relays 1TR, 2TR and 5TR will be held up by a circuit extending from terminal B2, through back contact *a* of relay FS, back contact *a* of relay 10D, front contact *a* of each of the respective unit digit register relays and the stick winding of each of the relays to terminal N. Relay 10TR will then be energized by a circuit which may be traced as follows: from terminal B2, through front contact *c* of relay 5TR, back contact *c* of relay 4TR, back contact *c* of relay 1D, front contact *d* of relay 1TR and the upper or energizing winding of relay 10TR to terminal N. Similar circuits involving contacts *d* of relays 2TR and 5TR in place of contact *d* of relay 1TR for energizing relays 20TR and 50TR may also be traced. Energization of the tens digit register relays will complete an energizing circuit for relay 10D as follows: from terminal B2, through front contact *c* of relay 5TR, back contact *c* of relay 4TR, back contact *b* of relay 10D, front contacts *a* of relays 10TR, 20TR and 50TR in parallel, the winding of relay 10D, and resistor 19 to terminal N of the power supply. Front contact *b* of relay 10D completes an obvious holding circuit for relay 10D before the energizing circuit is interrupted at back contact *b*. Back contact *a* of relay 10D opens the holding circuits for relays 1TR, 2TR and 5TR which will be deenergized provided that wiper arm 11 has moved off the "Operate" segment of the distributor 10. Front contact *d* of relay 10D completes a holding circuit for relay 10TR which may be traced from terminal B2 through front contact *d* of relay 10D, front contact *b* of relay 10TR and the stick winding of relay 10TR to terminal N of the power supply. Similar circuits may be traced for relays 20TR and 50TR. Relay 1D is held deenergized by applying energy from terminal B2 through front contact *b* of relay 10D to one side of the winding of relay 1D and from terminal B2 through the numeral checking contacts of the unit digit register relays and back contact *b* of relay 1D to the other side of the winding of relay 1D.

When the wiper arm 11 reaches the stop segment of the distributor 10, if this has not already occurred, relays 1TR, 2TR and 5TR will be deenergized. With the unit digit register relays cleared of any registration the numeral checking circuit will be open. This also opens the short circuit path through contact *c* of relay 5TR, contact *c* of relay 4TR and back contact *b* of relay 1D so that relay 1D is now energized over a circuit extending from terminal B2, through front contact *b* of relay 10D, the winding of relay 1D and resistor 20 to terminal N of the power supply. Energization of relay 1D opens the energizing path for the tens digit register relays at its back contact *c* and closes another holding circuit through front contact *e* of relay 1D for those tens digit register relays which are up.

The clearing of the unit digit register relays also completes the previously traced energizing path for relay M which again picks up its contact *a* to energize the release magnet 13 and thereby release the detent so that the arm 11 will again be driven through another complete revolution. In accordance with the example, punched holes are positioned in the tape aligned with the code reading contacts 15 so that when the contact arm 11 reaches the "Operate" segment of the distributor, energy from terminal B2 will be applied to energize relay 1TR, 2TR, 3TR and 5TR indicating the numeral one. With relay 1D up, holding circuits are established from terminal B2, through front contact *a* of relay 1D, front contacts *a* of relays 1TR, 2TR, 3TR and 5TR and the stick windings of the respective unit digit register relays to terminal N of the power supply. Energy will also be applied from terminal B2, through front contact *c* of relay 5TR, back contact *c* of relay 4TR, and front contact *b* of relay 1D to one side of the winding of relay 10D. Since energy from terminal B2 is also applied to the other side of winding of relay 10D through front contact *b* of relay 10D and contacts *a* of relays 10TR, 20TR and 50TR, relay 10D is, in effect, shorted out and releases its contacts. Front contact *d* of relay 10D now opens a holding circuit for the tens digit register relays which, however, remain unaffected since they are held up over holding circuits previously established through front contact *e* of relay 1D.

With relay 10D deenergized, relay 1D energized and the tens digit register relays and the unit digit register relays energized in the combinations previously described, energy will be applied from terminal B3 through back contact *e* of relay 10D, front contact *f* of relay 1D, front contact *g* of relay 5TR, back contact *g* of relay 4TR, front contact *e* of relay 3TR, front contact *g* of relay 2TR and front contact *g* of relay 1TR to point X1 in Fig. 1*b* which connects with point X1 on Fig. 1*a* thereby entering the unit digit circuit selection into the selection storage unit 16. Energy is also applied from terminal B3 through back contact *e* of relay 10D, front contact *f* of relay 1D, front contact *c* of relay 50TR, back contact *c* of relay 40TR, back contact *c* of relay 30TR and front contact *d* of relay 20TR to point X20 in Fig. 1*a* which connects with the second point X20 in the lower portion of Fig. 1*a* thus entering the tens digit circuit selection into the selection storage unit. It is is to be noted that no contact of relay 10TR is included in this last traced circuit for supplying energy to point X20. Since, in this present system, no use is made of the combination of relays 5TR and 2TR up and 1TR down, it is possible to eliminate a front contact of relay 1TR or 10TR when selecting a digit 2.

In the next example assume that number 21 is erroneously coded on the tape as the desired selection whereas the number 23 should have been marked as the proper selection. If the person preparing the tape notices his mistake, he will then mark two x's on the tape and following that the correct number 23.

The system will then operate as follows: first, the incorrect selection 21 will be entered into the selection storage unit as described above.

Next, the characters xx are registered in the digit register relays by the same process described above in connection with registration of the number 21 and will be indicated by the energization of relays 10TR, 40TR and 50TR and 1TR, 4TR and 5TR. An energizing circuit for the storage cancellation relay SCR will be established after registration of the second x which circuit may be traced as follows: from terminal B3, through back contact *e* of relay 10D, front contact *f* of relay 1D, front contact *g* of relay 5TR, front contact *g* of relay 4TR, front contact *f* of relay 1TR, front contact *d* of relay 50TR, front contact *e* of relay 40TR, front contact *f* of relay 10TR, and the winding of relay SCR to terminal N. Relay SCR picks up its contacts. The opening of back contact *a* of relay SCR removes energy from terminal B2 thus restoring all the digit register relays and the digit register detector relays to their normal, deenergized position. Contact *b* of relay SCR can be employed to control a circuit, not shown, whereby the selection previouly entered in the selection storage unit will be cancelled. For example, again consulting the reference Manual 517, the closing of front contact *b* of relay SCR may by-pass normally open contacts of cancellation push buttons in the manual selector to energize certain cancellation relays which results in the cancellation of the last-entered storage. The correct selection 23 will then be entered into the selection storage unit in place of the incorrectly entered number 21.

Assume now that an error has been made preparing the tape whereby only a single digit for example the digit 2, is marked on the tape. According to the discussion in the first example, the digit 2 would be registered in the tens digit register relays as would be indicated by the energization of relays 10TR, 20TR and 50TR.

Whenever, in preparation of the tape, the tape is advanced without being marked to indicate a character, it will be shown on the tape as a space mark represented by a single punched mark positioned so that when the tape is being interpreted it will cause energization of relay 3TR. This will be the case in the present example.

After the registration of the digit 2, relay 10D will be energized and relay 1D will also be in an energized condition. However, with only relay 3TR energized, there will be no circuit path through the number checking contacts of the unit digit register relays and relay 10D remains energized. With relay 10D and relay 1D both energized, the energizing circuit for relay NC will be open and the energizing circuits for the selection indicating circuits will be open at contact *e* of relay 10D.

But, with relay 3TR energized, relay FS will be energized over a path which may be traced from terminal B3, through back contact *e* of relay 1TR, back contact *e* of relay 2TR, front contact *c* of relay 3TR, back contact *e* of relay 4TR, back contact *e* of relay 5TR, and the winding of relay FS to terminal N. Relay FS picks up its contacts *a* and *b*. Contact *b* of relay FS opens the stick circuit for relay NC which becomes deenergized. Contact *b* of relay NC will remove energy from terminal B2 thereby cancelling any registration in the digit registering relays including relay 3TR. Contact *c* of relay 3TR in turn opens the energizing circuit just traced for relay FS. The system is now cleared of registrations and ready for another cycle of operation.

For the next example, assume that an error was made by the person preparing the coded tape such that a figure-shift symbol was coded into the tape in place of the first numeral of a two digit number designating the circuit to be selected. Punched marks on the tape would be positioned so that relays 1TR, 2TR, 4TR and 5TR would be energized when the portion of the tape coded to represent the figure-shift symbol was being interpreted by the code reading contacts 15. With this combination of relays no circuit will be completed through the number checking contacts of relays 1TR, 4TR and 5TR, so that no registration can take place in the tens digit register relays and relay 10D cannot be energized.

However, there will be established for relay FS an energizing circuit which may be traced as follows: from terminal B3, through front contact *e* of relay 1TR, front contact *f* of relay 2TR, front contact *f* of relay 4TR, front contact *f* of relay 5TR and the winding of relay FS to terminal N. The holding circuits for the unit digit register relays will be opened at back contact *a* of relay FS and these units digit register relays will then all be cleared of registration. Relay NC remains energized since relays 10D and 1D are both released. If the next digit of the group indicates a number, it will be registered in the tens digit register relays. If the error was recognized and a second digit also coded, the circuit selection will be completed in the proper manner. If the error was not recognized, the next character will be a space mark, since the perforating equipment requires at least one space mark between each pair of digits which constitute a circuit selection code. The number checking relay NC will be deenergized when this space mark is registered, in the manner described above in connection with an example wherein an incomplete number has been marked on the tape. Relay NC opens its contacts and removes energy from terminal B2 so that all the digit register and detector relays in the system will be returned to normal.

If the figure-shift character had been erroneously marked as the second digit of a group of two related digits, it would cause relays 1TR, 2TR, 4TR and 5TR to be energized. No circuit path could then be traced through the numeral checking contacts of relays 1TR, 2TR, 4TR and 5TR but a circuit for energizing relay FS would be established extending from terminal B3, through front contact *e* of relay 1TR, front contact *f* of relay 2TR, front contact *f* of relay 4TR, front contact *f* of relay 5TR and the winding of relay FS to terminal N. Operation would then be the same as described above in connection with an incomplete marking.

Although there is herein shown and described only one form of an automatic circuit selector constructed in accordance with the invention, it is to be understood that various changes and modifications may be made therein within the scope of the appended claims without departing from the spirit and scope of the invention. For example, although the automatic circuit selector has been shown as feeding selections to a storage unit and components have been included to permit certain functions and operations with a storage unit, the invention is by no means limited to such a specific arrangement and it is obvious that the circuits of the automatic circuit selector may be connected to directly control various external agencies which are capable of being electrically controlled.

Having thus described my invention, what I claim is:

1. A circuit selector for selecting a pair of circuits in accordance with coded representations of characters appearing consecutively on a code bearing medium, the selector comprising a plurality of code reading contacts, a first set of registering relays, a second set of registering relays, means for applying to the code reading contacts for controlled periods of time power for energizing said registering relays in combinations determined by the code on the code carrying medium, means operating in accordance with the significance of the last preceding character interpreted from the code bearing medium to cause the registration in the first set of registering relays to be transferred to the second set of registering relays or to remain in said first set of registering relays, means controlled by said first set of registering relays for producing a single electrical impulse indicating the selected circuit, and means controlled by said second set of registering relays for producing a single electrical impulse indicating the selected circuit.

2. A selector for selecting a pair of electrical circuits in accordance with a related pair of numerical digits recorded consecutively in code on a code carrying medium, the selector comprising a plurality of code reading contacts, means for applying electrical energy to said code reading contacts, a first set of digit registering relays equal in number to the number of code reading contacts and arranged to be energized in combinations determined by electrical impulses supplied through said code reading contacts in accordance with the code recorded on the portion of said code carrying medium being read, a second set of digit registering relays, means for causing the first digit of a related pair of consecutive numerical digits to be registered in said second set of digit registering relays and to cause the second digit of the related pair of consecutive numerical digits to be registered in said first set of digit registering relays, and means for selecting and energizing a pair of electrical circuits in accordance with the registrations in said first and second sets of digit registering relays.

3. A selector for selecting a pair of electrical circuits in accordance with a related pair of numerical digits recorded in code on a code carrying medium, the selector comprising a plurality of code reading contacts, means for applying electrical energy to said code reading contacts, a first set of digit registering relays equal in number to the number of code reading contacts and arranged to be energized in combinations determined by electrical impulses supplied through said code reading contacts in accordance with the code recorded on said code carrying medium, a second set of digit registering relays, means for causing the first of a related pair of numerical digits to be registered in said second set of digit registering relays and to cause the second digit of a related pair of numerical digits to be registered in said first set of digit registering relays, means for selecting and energizing a pair of electrical circuits in accordance with the registrations in said first and second sets of digit registering relays, and means effective whenever a digit interpreted from the coded information on the code carrying medium is not immediately followed by a related second digit to cancel registrations in the digit registering relays and prevent selection and energization of a circuit.

4. A selector for selecting a pair of electrical circuits in accordance with the significance of a related pair of numerical digits recorded in code on a code carrying medium, the selector comprising a plurality of code reading contacts, means for intermittently applying electrical energy to said code reading contacts, a plurality of digit registering relays equal in number to twice the number of code reading contacts, and divided into two equal groups, means for detecting the interpretation of the first of two related digits recorded on the code carrying medium, other detecting means for detecting the interpretation of the second of two related digits recorded on the code carrying medium, the relays of one group of registering relays being connected to the code reading contacts whereby each character interpreted from the code carrying medium is registered in said one group, and means controlled in part by said other detecting means for causing the first digit of two related numerical digits interpreted from the code carrying medium and registered in the relays of said one group to be transferred to the relays of said other group and to cause the second digit of a related pair of numerical digits interpreted from the code carrying medium to remain registered in the relays of said one group.

5. In an automatic circuit selector for converting circuit designations recorded in code on a code carrying medium to single electrical impulses suitable for storage in a selection storage unit having capacity for a finite number of storages, a source of energy, a plurality of code reading contacts, a plurality of registering relays connected to said code reading contacts, release means, means comprising a segmented contact and a rotating contact normally held against rotation but which is released upon energization of said release means for a controlled period of rotation, said segmented contact and said rotating contact controlling the periods during which energy from said source is applied to said code reading contacts and to said release means, and means for detecting saturation of said selection storage unit and for preventing the operation of said circuit selector to submit further storages to the storage unit unless a vacancy occurs.

6. In an automatic circuit selector for selecting and energizing a pair of circuits in accordance with a pair of related numerical digits denoted according to a predetermined code on a code carrying medium, a first source of electrical energy, a second source of electrical energy, a plurality of tape reading contacts, a plurality of registering relays connected to said tape reading contacts and arranged to receive energy from said first source of electrical energy and energized in combinations governed by the code being read, a numeral checking circuit including contacts of the registering relays arranged to detect when the coded notations being read from the code carrying medium represent a numerical digit, means for detecting when the first of two related numerical digits has been read from the code carrying medium, means for detecting when the second of a pair of related numerical digits has been read from the code carrying medium, means including contacts of said registering relays and energized from said second source of electrical energy for detecting when the character being interpreted from the code carrying medium is one of a preselected group of specific characters and for preventing the selection of the circuit when one of said group of specific characters intervenes between numerical digits interpreted from the code carrying medium.

7. An automatic circuit selector for selecting and energizing a pair of circuits in accordance with a related pair of numerical digits recorded in a multi-element code upon a code carrying medium, a plurality of code reading contacts equal in number to the number of elements in the multi-element code, a plurality of unit digit register relays equal in number to the number of code reading contacts, a plurality of tens digit register relays equal in number to the number of unit digit register delays, each of said tens digit register relays arranged to be controlled in part by a contact of the corresponding unit digit register relay, means for applying energy to said code reading contacts for a controlled period of time whereby the relays comprising said unit digit register relays are energized in combinations determined by coded notations on the portion of code carrying medium being interpreted by the code reading contacts, a tens digit detector relay, a unit digit detector relay, and means controlled by said digit detector relays to cause the registration of the first digit of a pair of related numerical digits interpreted from the code carrying medium to be transferred from said unit digit register relays to said tens digit register relays and to cause the registration of the second digit of a related pair of digits to remain registered in said unit digit register relays.

8. In an automatic circuit selector for selecting and energizing a pair of circuits in accordance with a pair of related numerical digits denoted according to a predetermined code on a code carrying medium, a first source of electrical energy, a second source of electrical energy, a plurality of tape reading contacts, a plurality of registering relays connected to said tape reading contacts and arranged to receive energy from said first source of electrical energy and energized in combinations governed by the code being read, a numeral checking circuit including contacts of the registering relays arranged to detect when the coded notations being read from the code carrying medium represent a numerical digit, means for detecting when the first of two related numerical digits has been read from the code carrying medium, means for detecting when the second of a pair of related numerical digits has been read from the code carrying medium, a relay in circuit with contacts of said registering relays and energized from said second source of electrical energy when the registering relays are energized in a combination which will close a circuit path through said contacts, said relay, when energized, cutting off said first source of electrical energy from the selector.

9. An automatic circuit selector for selecting and energizing a pair of circuits in accordance with a related pair of numerical digits recorded in a multi-element code upon a code carrying medium, a plurality of code reading contacts equal in number to the number of elements in the multi-element code, a plurality of unit digit register relays equal in number to the number of code reading contacts, a plurality of tens digit register relays equal in number to the number of unit digit register relays, each of said tens digit register relays arranged to be controlled in part by a contact of the corresponding unit digit register relay, means for applying energy to said code reading contacts for a controlled period of time whereby the relays comprising said unit digit register relays are energized in combinations determined by coded notations on the portion of code carrying medium being interpreted by the code reading contacts, a tens digit detector relay, a unit digit detector relay, and a contact of said unit digit detector relay connected in circuit with contacts of said unit digit register relays and with said tens digit register relays whereby, in the deenergized condition of said unit digit detector relay, energization of said unit digit register relays in predetermined combinations will complete an energizing path for corresponding tens digit register relays through said contact of the unit digit register relay.

10. An automatic circuit selector for selecting and energizing a pair of circuits in accordance with a related pair of numerical digits recorded in a multi-element code upon a code carrying medium, a plurality of code reading contacts equal in number to the number of elements in the multi-element code, a plurality of unit digit register relays equal in number to the number of code reading contacts, a plurality of tens digit register relays equal in number to the number of unit digit register relays, each of said tens digit register relays arranged to be controlled in part by a contact of the corresponding unit digit register relay, means for applying energy to said code reading contacts for a controlled period of time whereby the relays comprising said unit digit register relays are energized in combinations determined by coded notations on the portion of code carrying medium being interpreted by the code reading contacts, a tens digit detector relay, a unit digit detector relay, and a contact of said tens digit detector relay connected in circuit with contacts of said unit digit register relays and with contacts of said tens digit register relays where, in the deenergized condition of said tens digit detector relay, energization of said unit digit register relays in predetermined combinations will complete an energizing circuit for said tens digit detector relay and in the energized condition of said tens digit detector relay its contact will complete a circuit for maintaining it in energized condition.

References Cited in the file of this patent

UNITED STATES PATENTS

| | | |
|---|---|---|
| 1,664,539 | Bryce | Apr. 3, 1928 |
| 2,025,602 | Maul | Dec. 24, 1935 |